US012732584B2

(12) United States Patent
Horie

(10) Patent No.: US 12,732,584 B2
(45) Date of Patent: Sep. 8, 2026

(54) IMAGE PROCESSING APPARATUS, NON-TRANSITORY COMPUTER READABLE MEDIUM STORING PROGRAM, AND IMAGE PROCESSING METHOD THAT OUTPUT PROGRESS INFORMATION OF JOB PROCESSING TO USER

(71) Applicant: FUJIFILM Business Innovation Corp., Tokyo (JP)

(72) Inventor: Daigo Horie, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,173

(22) Filed: Mar. 23, 2023

(65) Prior Publication Data

US 2024/0098204 A1 Mar. 21, 2024

(30) Foreign Application Priority Data

Sep. 16, 2022 (JP) ................................ 2022-148126

(51) Int. Cl.
*H04N 1/333* (2006.01)
*H04N 1/32* (2006.01)

(52) U.S. Cl.
CPC ..... *H04N 1/33376* (2013.01); *H04N 1/32454* (2013.01); *H04N 2201/0017* (2013.01)

(58) Field of Classification Search
CPC .................................................. H04N 1/33376
See application file for complete search history.

(56) References Cited

U.S. PATENT DOCUMENTS 9,535,662 B2 * 1/2017 Ohhashi .................... G06F 8/30
2001/0025326 A1 * 9/2001 Kizaki ............... H04N 1/00127 710/100
2010/0134829 A1 * 6/2010 Kayama ................ G06F 3/1259 358/1.15
2010/0212010 A1 * 8/2010 Stringer .................. G06F 21/52 726/22
2011/0289513 A1 * 11/2011 Degirmenci ............ G06F 9/546 719/313
2012/0209946 A1 * 8/2012 McClure .............. H04N 21/439 709/224
2015/0195422 A1 * 7/2015 Hakozaki ........... H04N 1/32502 358/1.15
2015/0347747 A1 * 12/2015 Yancey ................... G06F 21/53 726/28

(Continued)

FOREIGN PATENT DOCUMENTS

JP 2014059718 4/2014

*Primary Examiner* — Benjamin O Dulaney
(74) *Attorney, Agent, or Firm* — JCIPRNET

(57) ABSTRACT

An image processing apparatus includes a memory that stores first progress information representing progress of processing of a job, a first program accessible to the first progress information, and a second program that performs transfer processing of the job; and a processor configured to: execute the transfer processing of transferring the job by the second program; update, by the second program, second progress information representing progress of the transfer processing by the second program, the progress being according to a unit of the job; and output updated first progress information by the first program, using the second progress information updated by the second program.

10 Claims, 6 Drawing Sheets

(56) References Cited

U.S. PATENT DOCUMENTS

| | | | | |
|---|---|---|---|---|
| 2016/0182762 | A1* | 6/2016 | Eum | H04N 1/00307 358/1.14 |
| 2020/0310714 | A1* | 10/2020 | Koike | G06F 3/1288 |
| 2022/0027098 | A1* | 1/2022 | Miyata | G06F 3/1267 |
| 2023/0035492 | A1* | 2/2023 | Kimura | G06F 3/1229 |
| 2023/0161526 | A1* | 5/2023 | Takagi | G06F 3/1268 358/1.15 |
| 2023/0401012 | A1* | 12/2023 | Sugaya | G06F 3/1207 |

* cited by examiner

IMAGE PROCESSING APPARATUS, NON-TRANSITORY COMPUTER READABLE MEDIUM STORING PROGRAM, AND IMAGE PROCESSING METHOD THAT OUTPUT PROGRESS INFORMATION OF JOB PROCESSING TO USER

CROSS-REFERENCE TO RELATED APPLICATIONS

This application is based on and claims priority under 35 USC 119 from Japanese Patent Application No. 2022-148126 filed Sep. 16, 2022.

BACKGROUND

(i) Technical Field

The present invention relates to an image processing apparatus, a non-transitory computer readable medium storing a program, and an image processing method.

(ii) Related Art

JP2014-059718A discloses an information processing apparatus that has a first program that causes the information processing apparatus to execute display of a first screen regarding processing using hardware unique to the information processing apparatus, and the processing according to setting information input via the first screen, in which the first program includes an interface for receiving the setting information regarding the processing from a second program, and causes the information processing apparatus to execute the processing according to the setting information received from the second program.

SUMMARY

There is an image processing apparatus in which a program for extending or changing functions of the image processing apparatus can be added and installed. In a case where such an added program is able to access a storage unit of the image processing apparatus that manages progress information of job processing, the progress information may be altered, so that access is disabled. Therefore, the added program cannot output the progress information to a user.

Aspects of non-limiting embodiments of the present disclosure relate to an image processing apparatus, a non-transitory computer readable medium storing a program, and an image processing method that can output progress information of job processing to a user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a memory that stores first progress information representing progress of processing of a job, a first program accessible to the first progress information, and a second program that performs transfer processing of the job; and a processor configured to: execute the transfer processing of transferring the job by the second program; update, by the second program, second progress information representing progress of the transfer processing by the second program, the progress being according to a unit of the job; and output updated first progress information by the first program, using the second progress information updated by the second program.

BRIEF DESCRIPTION OF THE DRAWINGS

Exemplary embodiment(s) of the present invention will be described in detail based on the following figures, wherein.

DETAILED DESCRIPTION

Exemplary Embodiment

Figure 1:
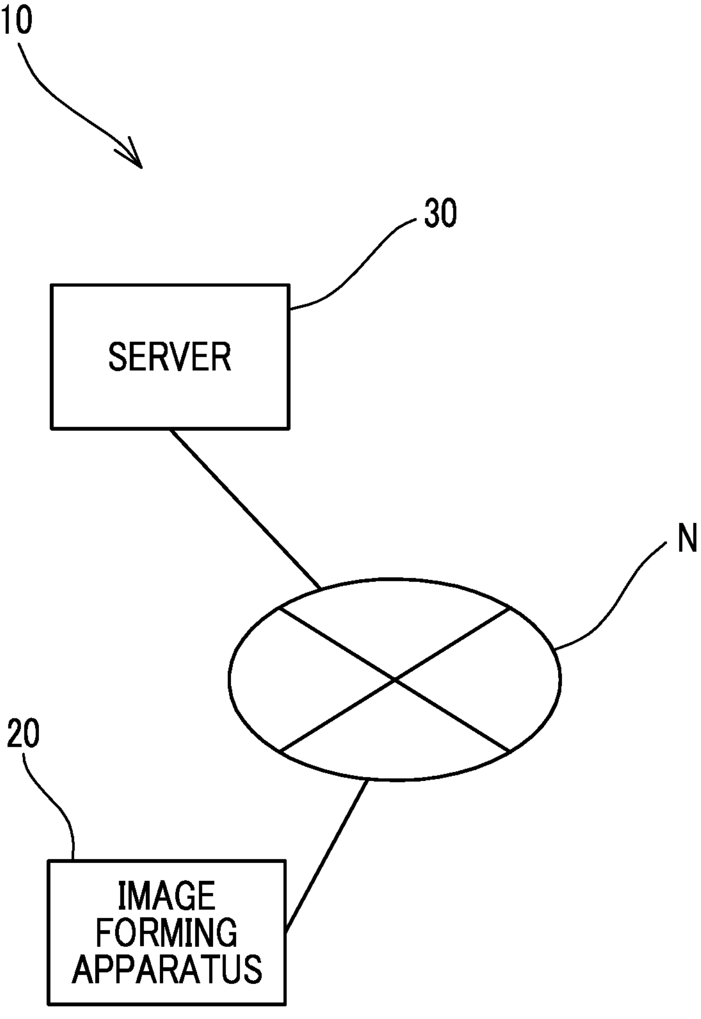
FIG. 1 is a schematic configuration diagram of an image processing system according to an exemplary embodiment of the invention.

Hereinafter, an example of an exemplary embodiment of the present disclosure will be described with reference to the drawings. In each drawing, the identical or equivalent constituents and portions are given the identical reference numerals. The dimensional ratios in the drawings are exaggerated for convenience of explanation, and may differ from the actual ratios.

An example of an image processing system 10 according to the present exemplary embodiment will be described using FIG. 1.

FIG. 1 is a diagram illustrating an example of a schematic configuration of the image processing system 10 according to the present exemplary embodiment.

As illustrated in FIG. 1, in the image processing system 10 according to the present exemplary embodiment, an image forming apparatus 20 and a server 30 are connected to each other via a network N. For the network N, for example, a local area network (LAN), a wide area network (WAN), the Internet, and the like are applied.

The image forming apparatus 20 has various functions such as a print function, a copy function, a facsimile function, and a scanner function. The image forming apparatus 20 in the present exemplary embodiment is an example of an image processing apparatus.

The server 30 stores job data transferred from the image forming apparatus 20. Here, the server 30 includes a personal computer (PC) and the like.

Figure 2:
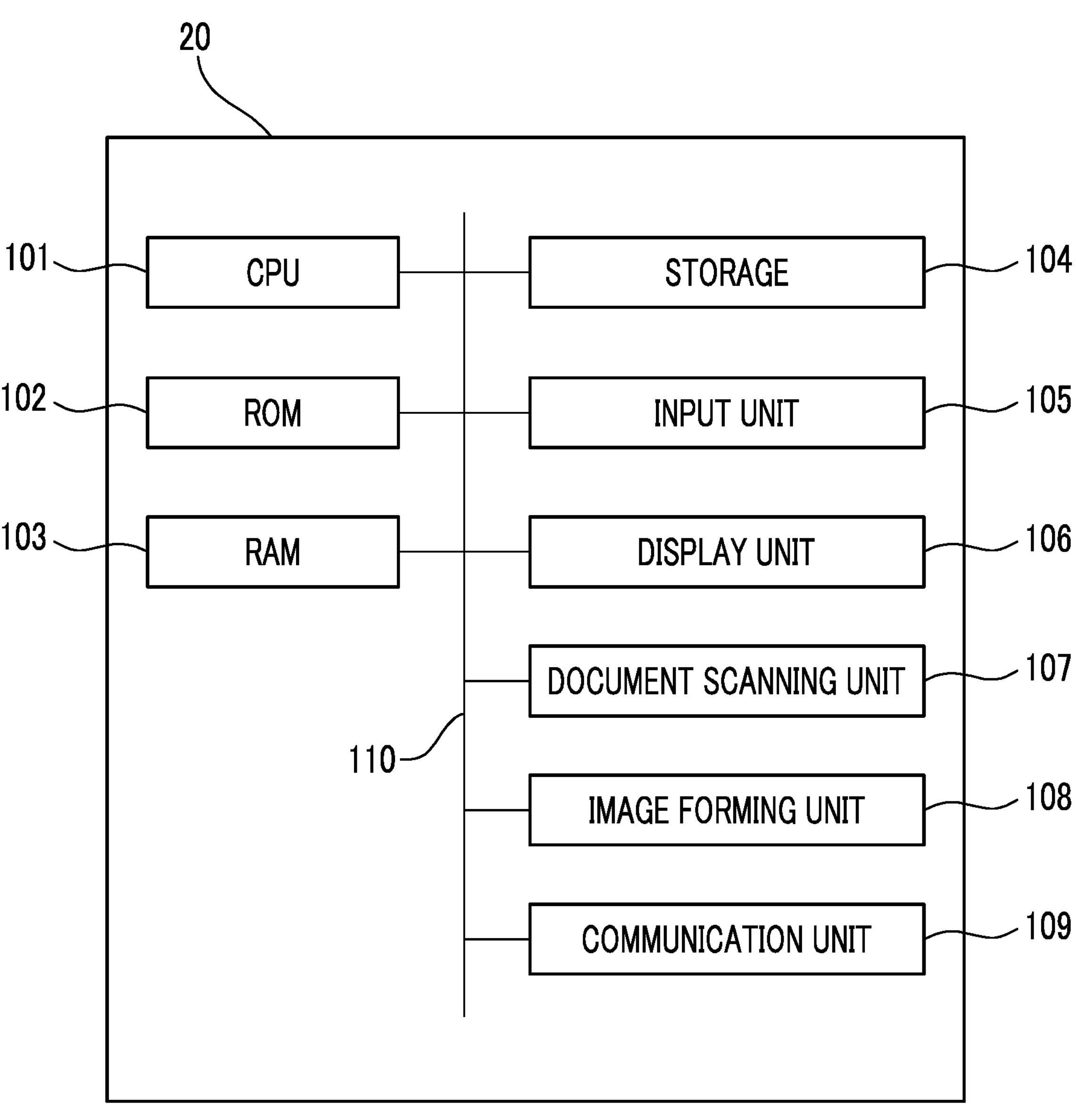
FIG. 2 is a schematic block diagram of an image forming apparatus according to an exemplary embodiment of the invention.

Next, a hardware configuration of the image forming apparatus 20 will be described. FIG. 2 is a block diagram illustrating a hardware configuration of the image forming apparatus 20 according to the present exemplary embodiment.

As illustrated in FIG. 2, the image forming apparatus 20 has a central processing unit (CPU) 101 that is an example of a processor, a read only memory (ROM) 102, a random access memory (RAM) 103, a storage 104, an input unit 105, a display unit 106, a document scanning unit 107, an image forming unit 108, and a communication unit 109. Respective configurations are connected to each other to perform communication via a bus 110.

The CPU 101 is a central processing unit, executes various programs, and controls each unit. That is, the CPU 101 reads a program from the ROM 102 or the storage 104, and executes the program using the RAM 103 as a working area. The CPU 101 controls each configuration and performs various kinds of arithmetic processing according to the program recorded in the ROM 102 or the storage 104.

Figure 3:
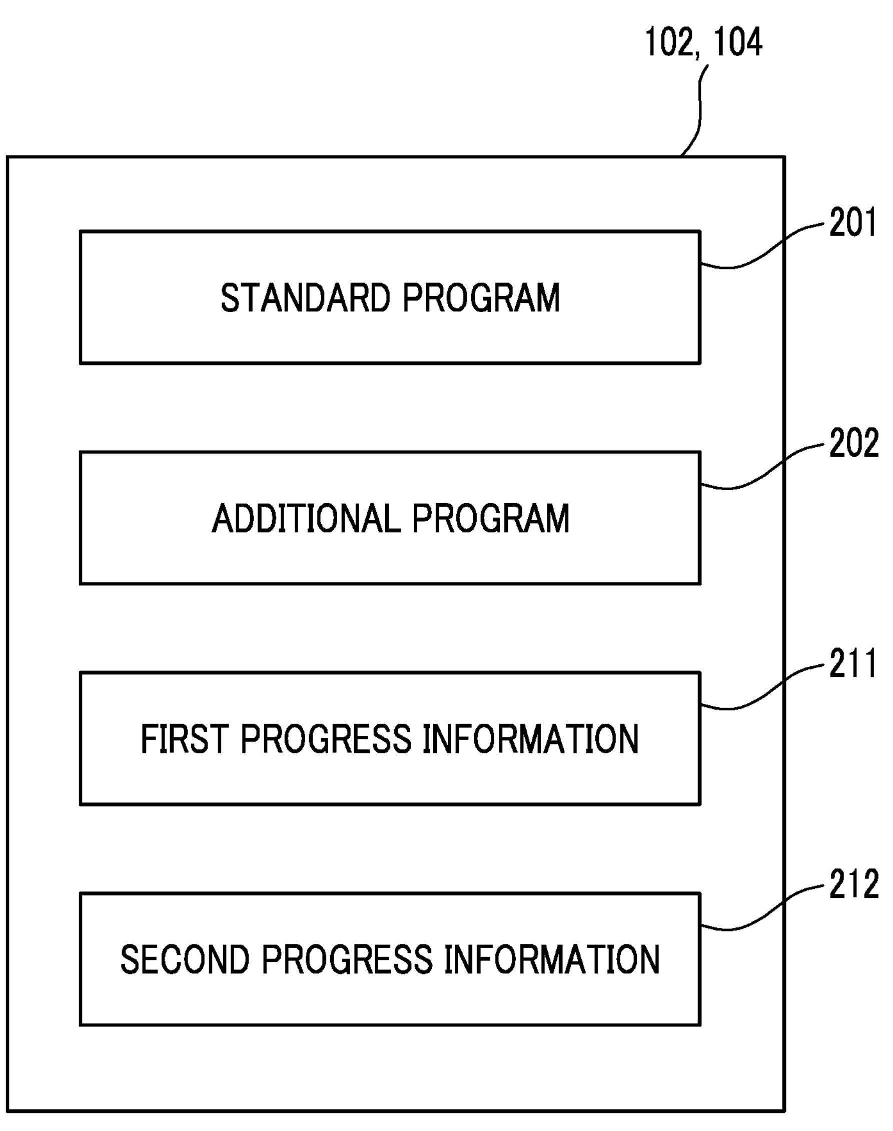
FIG. 3 is a block diagram illustrating a configuration of a ROM or a storage of the image forming apparatus according to an exemplary embodiment.

Here, the ROM 102 or the storage 104 is an example of a memory. In the present exemplary embodiment, as illustrated in FIG. 3, a standard program 201 that is an example of a first program is stored in the ROM 102, and an additional program 202 that is an example of a second program, first progress information 211, and second progress information 212 are stored in the storage 104. The standard program 201 is a program installed in advance in the image forming apparatus 20, and is a program having a function for the transfer processing of a job of a document scanned by the scanner function of the image forming apparatus 20 in a case where the additional program 202 is not used. The additional program 202 is a program installed later in the image forming apparatus 20 by the user, and is a program having a function for the transfer processing of a job instead of the standard program 201. The additional program 202 has more functions than the standard program 201, such as a function that can be used for the transfer processing, for example, a function that can set a transfer destination in advance according to the contents of the job, and also can perform the transfer processing that cannot be performed by the standard program 201. Further, the additional program 202 may be capable of setting the transfer processing according to the user's preference. The first progress information 211 is information representing the progress of the job processing. The first progress information 211 is accessible by the standard program 201, and is inaccessible by the additional program 202. The second progress information 212 is information representing the progress according to the unit of the job, which is the progress of the transfer processing by the additional program 202.

The ROM 102 stores various programs and various kinds of data. The RAM 103 temporarily stores the program or data as a working area. The storage 104 is configured by a hard disk drive (HDD) or a solid state drive (SSD), and stores various programs including an operating system, and various kinds of data.

The input unit 105 includes a pointing device such as a mouse, and a keyboard, and is used for performing various inputs. The input unit 105 is used for settings such as blank page removal in a case where a document to be described later is scanned. In the present exemplary embodiment, the display unit 106 which is a touch panel type functions as the input unit 105.

The display unit 106 is a liquid crystal display, for example. The display unit 106 displays various kinds of information on the basis of the control of the CPU 101. The display unit 106 also functions as the input unit 105 by adopting the touch panel type.

The document scanning unit 107 obtains image information by taking in documents placed on a paper tray of an automatic document feeder (ADF) (not illustrated), which is provided on the upper portion of the image forming apparatus 20, one by one and optically scanning the documents. Alternatively, the document scanning unit 107 obtains image information by optically scanning documents placed on a stand such as a platen glass.

The image forming unit 108 forms, that is, prints print data included in a print job obtained from a PC (not illustrated) or the like connected via the network N or an image based on the image information obtained by the scanning by the document scanning unit 107, on a recording medium such as paper.

The communication unit 109 is connected to the network N, and performs communication such as job transfer processing with the image forming apparatus 20 and other devices such as the server 30. The communication unit 109 connects the image forming apparatus 20 to a public line, and transmits and receives the image information obtained by the scanning by the document scanning unit 107 to and from another image forming apparatus having a FAX function.

Next, the operation of the image processing system 10 will be described.

Figure 4:
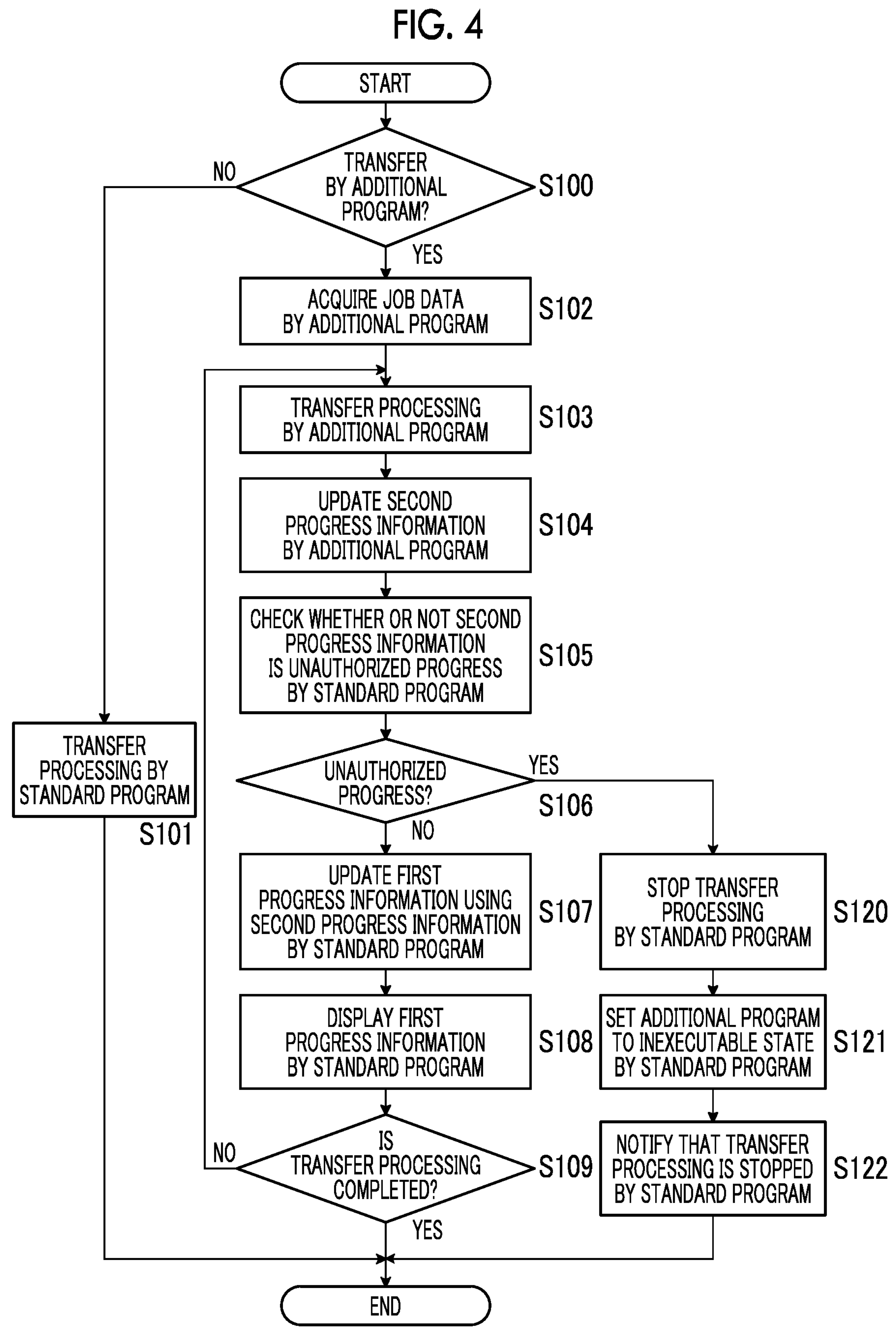
FIG. 4 is a flowchart illustrating an example of a flow of transfer processing of a job and display processing of progress information of the transfer processing using the image forming apparatus according to an exemplary embodiment of the invention.

The flow of the transfer processing of a job and the display processing of the progress information of the transfer processing using the image forming apparatus 20 will be described using FIG. 4. In FIG. 4, a case where the unit of the job is the "number of pages" and the transfer processing of the job to the server 30 is performed by the additional program 202 will be described as an example. As a premise, a document consisting of a plurality of pages is scanned by the scanner function of the image forming apparatus 20 or the like, and is stored in the storage 104 or the RAM 103 as a job.

In Step S100, the CPU 101 determines whether the transfer processing of the job stored in the storage 104 is performed by the additional program 202 on the basis of the user's operation. That is, it is determined whether the user selects to execute the transfer processing using the additional program 202 instead of the standard program 201 installed in advance in the image forming apparatus 20. In a case where it is determined not to perform the transfer by the additional program 202, the processing proceeds to Step S101, and the standard program 201 executes the transfer processing of the job. Here, the transfer processing of the job performed by the standard program 201 is normal transfer processing, and thus the description thereof is omitted. On the other hand, in a case where it is determined that the transfer is performed by the additional program 202, the processing proceeds to Step S102.

In Step S102, the additional program 202 acquires the job data, and acquires and sets the "number of pages" that is the unit of the job stored in the job, and the "total number of pages" that is a total amount of the job, for example, "20 pages". Then, the processing proceeds to Step S103.

In Step S103, the additional program 202 performs the transfer processing of the job to the server 30. Then, the processing proceeds to Step S104.

In Step S104, the additional program 202 updates the second progress information 212. That is, the second progress information 212 is updated by updating the "number of transferred pages" that is a processing amount of the job transferred to the server 30 in Step S103. For example, the "number of transferred pages" is increased by "1". Then, the processing proceeds to Step S105.

In Step S105, the standard program 201 checks whether or not the second progress information 212 updated by the additional program 202 in Step S104 is predetermined unauthorized progress. That is, it is determined whether or not the processing amount of the job transferred to the server 30 by the additional program 202 exceeds the total amount of the corresponding job stored in the storage 104 and whether or not the total amount of the job exceeds the total amount of the corresponding job stored in the storage 104. For example, it is determined whether or not the processing amount of the job is "21 pages" exceeding "20 pages" as the total number of pages. Further, it is determined whether or not the total number of pages of the job is altered to "21 pages" exceeding "20 pages". Then, the processing proceeds to Step S106. Note that the check is not limited to being performed by the standard program 201, and may be performed by another program.

In a case where it is determined in Step S106 that the updated second progress information is not unauthorized progress, the processing proceeds to Step S107.

In Step S107, the standard program 201 updates the first progress information 211 using the second progress information 212 updated by the additional program 202 in Step S104. Then, the processing proceeds to Step S108.

In Step S108, the standard program 201 displays the first progress information 211. That is, the "total number of pages" and the "number of transferred pages" are displayed on the display unit 106. Then, the processing proceeds to Step S109.

In Step S109, it is determined whether or not the transfer processing is completed, that is, the transfer up to the final page is performed. In a case where it is determined that the transfer processing is completed, the processing is ended. On the other hand, in a case where it is not determined that the transfer processing is completed, the processing returns to Step S103.

In a case where it is determined in Step S106 that the updated second progress information is unauthorized progress, the processing proceeds to Step S120, and the standard program 201 stops the transfer processing by the additional program 202. Then, the processing proceeds to Step S121. Note that the processing is not limited to being performed by the standard program 201, and may be performed by another program.

In Step S121, the standard program 201 sets the additional program 202 to an inexecutable state. Here, the inexecutable state includes, in addition to a case where the program is inexecutable, disabling access to the job from the additional program 202, disabling the user to select the transfer by the additional program 202 by not displaying a user interface (UI) of the additional program 202 on the display unit 106, uninstalling the additional program 202, and the like. Then, the processing proceeds to Step S122. Note that the processing is not limited to being performed by the standard program 201, and may be performed by another program.

In Step S122, the standard program 201 notifies a predetermined person that the transfer processing by the additional program 202 is stopped. For example, the notification is made by transmitting an e-mail to an administrator of the image forming apparatus 20 or the user who is performing the transfer processing of the job, or by displaying the fact on the display unit 106. Then, the processing is ended. Note that the notification is not limited to being performed by the standard program 201, and may be performed by another program.

Next, an output example of the first progress information 211 by the standard program 201 will be described with reference to FIGS. 5 and 6.

Figure 5:
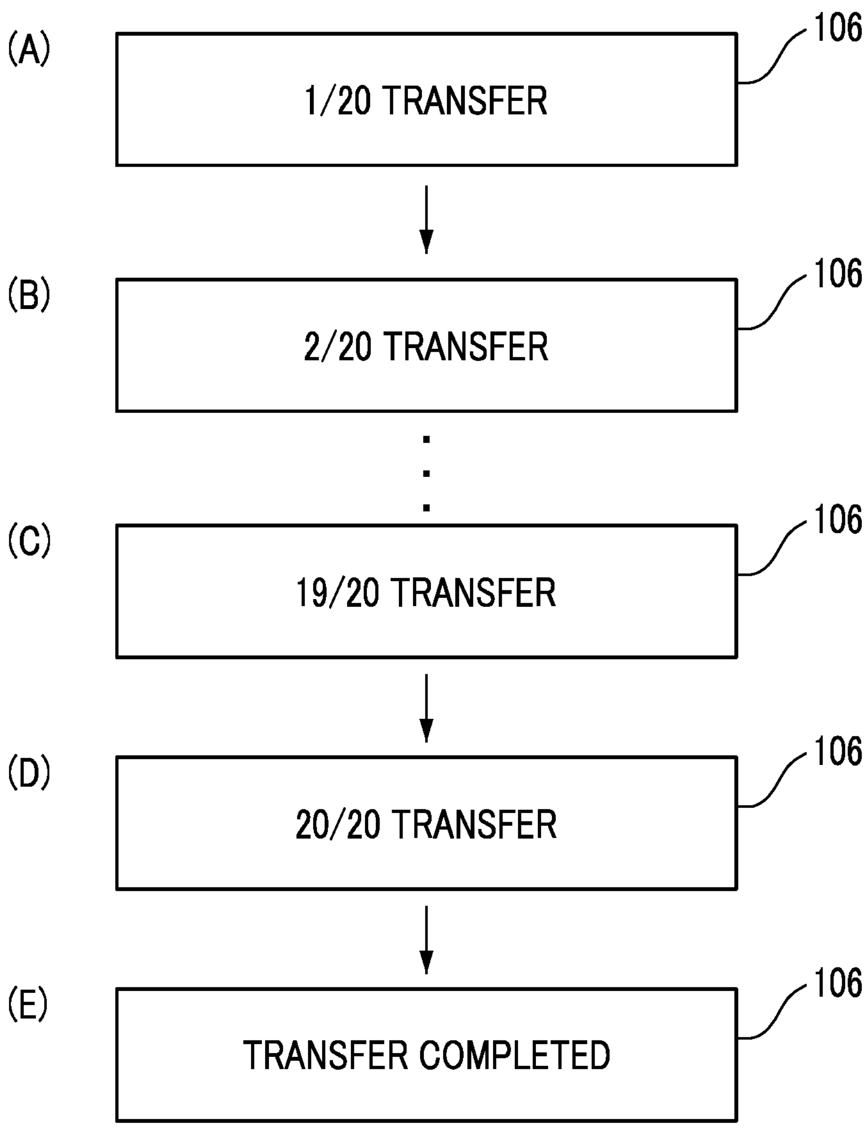
FIG. 5 is an explanatory diagram for describing an output example of first progress information according to an exemplary embodiment of the invention.
Figure 6:
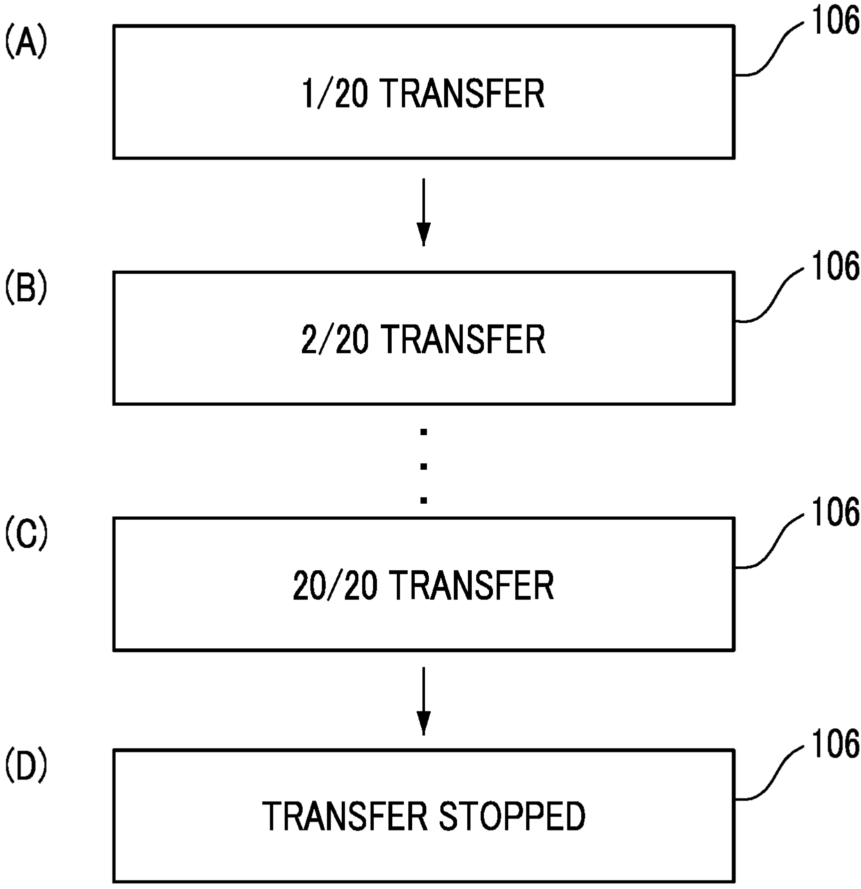
FIG. 6 is an explanatory diagram for describing another output example of first progress information according to an exemplary embodiment of the invention.

FIGS. 5 and 6 illustrate an output example of the first progress information 211 in a case where the unit of the job is the "number of pages" and the transfer processing of the job to the server 30 is performed by the additional program 202 similar to the flowchart illustrated in FIG. 4 described above. Here, the first progress information 211 is progress information updated by the standard program 201 by using the second progress information 212 updated by the additional program 202.

FIG. 5 is an example of a case where the transfer processing by the additional program 202 is authorized and the transfer processing is normally ended.

As illustrated in FIG. 5, the first progress information 211 is displayed on the display unit 106 in a display format (numerator/denominator) in which the "total number of pages" that is the total amount of the job is the denominator and the "number of transferred pages" that is the processing amount of the job transferred to the server 30 is the numerator. The output of the first progress information 211 is not limited to the display format of numerator/denominator, and any format is used as long as the user can recognize the progress of the transfer processing. The output of the first progress information 211 is not limited to the case of being displayed on the display unit 106, and may be output using voice or the like.

First, in a case where the additional program 202 transfers "1" page among "20" pages, the second progress information 212 is updated to the information "1 page among 20 pages is transferred". The updated second progress information 212 is acquired by the standard program 201, and it is checked whether or not the corresponding second progress information 212 is predetermined unauthorized progress. Since the present example illustrates an authorized case, the first progress information 211 is updated, and "1/20 transfer" is displayed on the display unit 106 using a display format "1/20" in which the total number of pages "20" is the denominator and the processing amount "1" is the numerator as illustrated in (A) of FIG. 5.

Next, in a case where the additional program 202 transfers "2" pages among "20" pages, the second progress information 212 is updated to the information "2 pages among 20 pages are transferred". The updated second progress information 212 is acquired by the standard program 201, and it is checked whether or not the corresponding second progress information 212 is predetermined unauthorized progress. Since the present example illustrates an authorized case, the first progress information 211 is updated, and "2/20 transfer" is displayed on the display unit 106 using the display format "2/20" in which the total number of pages "20" is the denominator and the processing amount "2" is the numerator as illustrated in (B) of FIG. 5.

In a case where the transfer processing is repeated so that the update of the second progress information 212 is ended by the ending of the transfer of the final 20 pages as illustrated in (C) of FIG. 5 and (D) of FIG. 5, the text "transfer completed" is displayed, and it is notified that the transfer is normally ended, as illustrated in (E) of FIG. 5.

FIG. 6 is an example of a case where the transfer processing by the additional program 202 is unauthorized and the transfer processing is stopped.

First, in a case where the additional program 202 transfers "1" page among "20" pages, the second progress information 212 is updated to the information "1 page among 20 pages is transferred". The updated second progress information 212 is acquired by the standard program 201, and it is checked whether or not the corresponding second progress information 212 is predetermined unauthorized progress. Since the present example illustrates an authorized case, the first progress information 211 is updated, and "1/20 transfer"

is displayed on the display unit 106 using a display format "1/20" in which the total number of pages "20" is the denominator and the processing amount "1" is the numerator as illustrated in (A) of FIG. 6.

Next, in a case where the additional program 202 transfers "2" pages among "20" pages, the second progress information 212 is updated to the information "2 pages among 20 pages are transferred". The updated second progress information 212 is acquired by the standard program 201, and it is checked whether or not the corresponding second progress information 212 is predetermined unauthorized progress. Since the present example illustrates an authorized case, the first progress information 211 is updated, and "2/20 transfer" is displayed on the display unit 106 using the display format "2/20" in which the total number of pages "20" is the denominator and the processing amount "2" is the numerator as illustrated in (B) of FIG. 6.

The transfer processing is repeated so that the transfer of the final 20 pages is performed as illustrated in (C) of FIG. 6. Even though the transfer of the final page is ended, the transfer processing by the additional program 202 is not ended, the update of the second progress information 212 is continued, and thus in a case where the second progress information 212 is updated to the information of "21 pages among 20 pages are transferred" so that the numerator becomes "21" to exceed the denominator "20", the standard program 201 determines whether or not the transfer processing by the additional program 202 is unauthorized. Then, the standard program 201 displays the text "transfer stop" as illustrated in (D) of FIG. 6, and it is notified that the transfer processing is stopped in the middle. It may be notified that the additional program 202 is inexecutable hereafter in addition to the fact that the transfer processing is stopped in the middle.

In the present exemplary embodiment, the progress information is useful information serving as a basis for the usage fee of the image forming apparatus 20 and the like. Therefore, only the program installed in advance in the image forming apparatus 20 is made accessible, and the program installed later is made inaccessible in order to avoid the data alteration. However, even in a case of using the program installed later, displaying the progress information improves the convenience for the user. According to the exemplary embodiment described above, even in a case of using the additional program 202 having more functions than the standard program 201, accurate progress information may be provided to the user without causing the additional program 202 to access the useful information of the image forming apparatus 20.

Modification Example

The invention is not limited to the exemplary embodiment described above, and various modifications and applications can be made without departing from the gist of the invention.

In the exemplary embodiment described above, a case where the unit of the job is the "number of pages" has been described, but the unit of the job is not limited to the "number of pages". For example, the "data amount" or the "number of destinations" may be used. Here, the "data amount" is the number of bytes of the job. The "number of destinations" is the number of destinations to which the job is transferred, that is, the number of destinations in a case where the job is transferred to a plurality of servers 30 or in a case where the job is transferred to a plurality of folders provided in the server 30.

In a case where the unit of the job is the "data amount", the total amount of the job is the "number of total bytes to be transferred". The processing amount of the job transferred to the server 30 is the "number of transferred bytes", the numerator is the "number of transferred bytes", and the denominator is the "number of total bytes to be transferred" (number of transferred bytes/number of total bytes to be transferred). Therefore, in a case where the "number of transferred bytes" by the additional program 202 exceeds the "number of total bytes to be transferred" or in a case where the "number of total bytes to be transferred" exceeds the data amount of the corresponding job stored in the storage 104, the transfer processing is determined to be unauthorized, and is stopped.

In a case where the unit of the job is the "number of destinations", the total amount of the job is the "number of destinations to which the transfer is to be made". The processing amount of the job transferred to the server 30 is the "number of destinations to which the transfer has been made", the numerator is the "number of destinations to which the transfer has been made", and the denominator is the "number of destinations to which the transfer is to be made" (number of destinations to which the transfer has been made/number of destinations to which the transfer is to be made). Therefore, in a case where the "number of destinations to which the transfer has been made" by the additional program 202 exceeds the "number of destinations to which the transfer is to be made" or in a case where the "number of destinations to which the transfer is to be made" exceeds the number of destinations of the corresponding job stored in the storage 104, the transfer processing is determined to be unauthorized, and is stopped.

In the exemplary embodiment described above, a mode in which the program is stored (installed) in advance in the ROM 102 or the storage unit (storage) 104 has been described, but the invention is not limited thereto. The program may be provided in a form recorded in a recording medium such as a compact disk read only memory (CD-ROM), a digital versatile disk read only memory (DVD-ROM), and a universal serial bus (USB) memory. Further, the program may be downloaded from an external device via the network N.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The following is further disclosed regarding the exemplary embodiment described above.

(((1)))

An image processing apparatus comprising:

a memory that stores first progress information representing progress of processing of a job, a first program accessible to the first progress information, and a second program that performs transfer processing of the job; and a processor configured to:

execute the transfer processing of transferring the job by the second program;

update, by the second program, second progress information representing progress of the transfer processing by the second program, the progress being according to a unit of the job; and output updated first progress information by the first program, using the second progress information updated by the second program.

(((2)))

The image processing apparatus according to (((1))), wherein the processor is configured to:

stop the transfer processing of the second program in a case where the second progress information updated by the second program is in a predetermined state.

(((3)))

The image processing apparatus according to (((1))) or (((2))), wherein the processor is configured to:

cause the first program to stop the transfer processing of the second program in a case where a total amount of the job updated by the second program exceeds a total amount stored in the memory.

(((4)))

The image processing apparatus according to any one of (((1))) to (((3))), wherein the processor is configured to:

stop the transfer processing of the second program in a case where a processing amount of the job transferred from the second program exceeds a total amount stored in the memory.

(((5)))

The image processing apparatus according to any one of (((2))) to (((4))), wherein the processor is configured to:

set the second program of which the transfer processing is stopped in an inexecutable state.

(((6)))

The image processing apparatus according to any one of (((2))) to (((5))), wherein the processor is configured to:

notify a predetermined person that the transfer processing by the second program is stopped.

(((7)))

The image processing apparatus according to any one of (((1))) to (((6))), wherein the first program is a program installed in advance in the image processing apparatus, and the second program is a program installed later in the image processing apparatus by a user.

(((8)))

The image processing apparatus according to any one of (((1))) to (((7))), wherein the unit of the job includes the number of pages, a data amount, or the number of destinations of the job.

(((9)))

A program for causing a computer including a memory that stores first progress information representing progress of processing of a job, a first program accessible to the first progress information, and a second program that performs transfer processing of the job, and a processor, to execute a process comprising:

executing the transfer processing of transferring the job by the second program;

updating, by the second program, second progress information representing progress of the transfer processing by the second program, the progress being according to a unit of the job; and outputting updated first progress information by the first program, using the second progress information updated by the second program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a memory that stores first progress information representing progress of processing of a job, a first program with access to the first progress information, and a second program with no access to the first progress information; and a processor configured to:

execute transfer processing of transferring the job by the second program;

update, by the second program, second progress information representing progress of the transfer processing by the second program, the progress being according to a unit of the job;

update, by the first program, the first progress information by using the updated second progress information; and output the updated first progress information by the first program.

2. The image processing apparatus according to claim 1, wherein the processor is configured to:

stop the transfer processing of the second program in a case where the second progress information updated by the second program is in a predetermined state.

3. The image processing apparatus according to claim 2, wherein the processor is configured to:

set the second program of which the transfer processing is stopped in an inexecutable state.

4. The image processing apparatus according to claim 2, wherein the processor is configured to:

notify a predetermined person that the transfer processing by the second program is stopped.

5. The image processing apparatus according to claim 1, wherein the processor is configured to:

cause the first program to stop the transfer processing of the second program in a case where a total amount of the job updated by the second program exceeds a total amount stored in the memory.

6. The image processing apparatus according to claim 1, wherein the processor is configured to:

stop the transfer processing of the second program in a case where a processing amount of the job transferred from the second program exceeds a total amount stored in the memory.

7. The image processing apparatus according to claim 1, wherein the first program is a program installed in advance in the image processing apparatus, and the second program is a program installed later in the image processing apparatus by a user.

8. The image processing apparatus according to claim 1, wherein the unit of the job includes the number of pages, a data amount, or the number of destinations of the job.

9. A non-transitory computer readable medium storing a program for causing a computer including a memory that stores first progress information representing progress of processing of a job, a first program with access to the first progress information, and a second program with no access to the first progress information, and a processor, to execute a process comprising:

executing transfer processing of transferring the job by the second program;

updating, by the second program, second progress information representing progress of the transfer processing by the second program, the progress being according to a unit of the job;

updating, by the first program, the first progress information by using the updated second progress information; and outputting the updated first progress information by the first program.

10. An image processing method of an image processing apparatus including a memory that stores first progress information representing progress of processing of a job, a first program with access to the first progress information, and a second program with no access to the first progress information, and a processor, the image processing method comprising:

executing transfer processing of transferring the job by the second program;

updating, by the second program, second progress information representing progress of the transfer processing by the second program, the progress being according to a unit of the job;

updating, by the first program, the first progress information by using the updated second progress information; and outputting the updated first progress information by the first program.

* * * * *